March 12, 1957 G. E. FRANCK 2,784,618
REAMER MEMBER FOR A TOOL
Filed Jan. 30, 1953
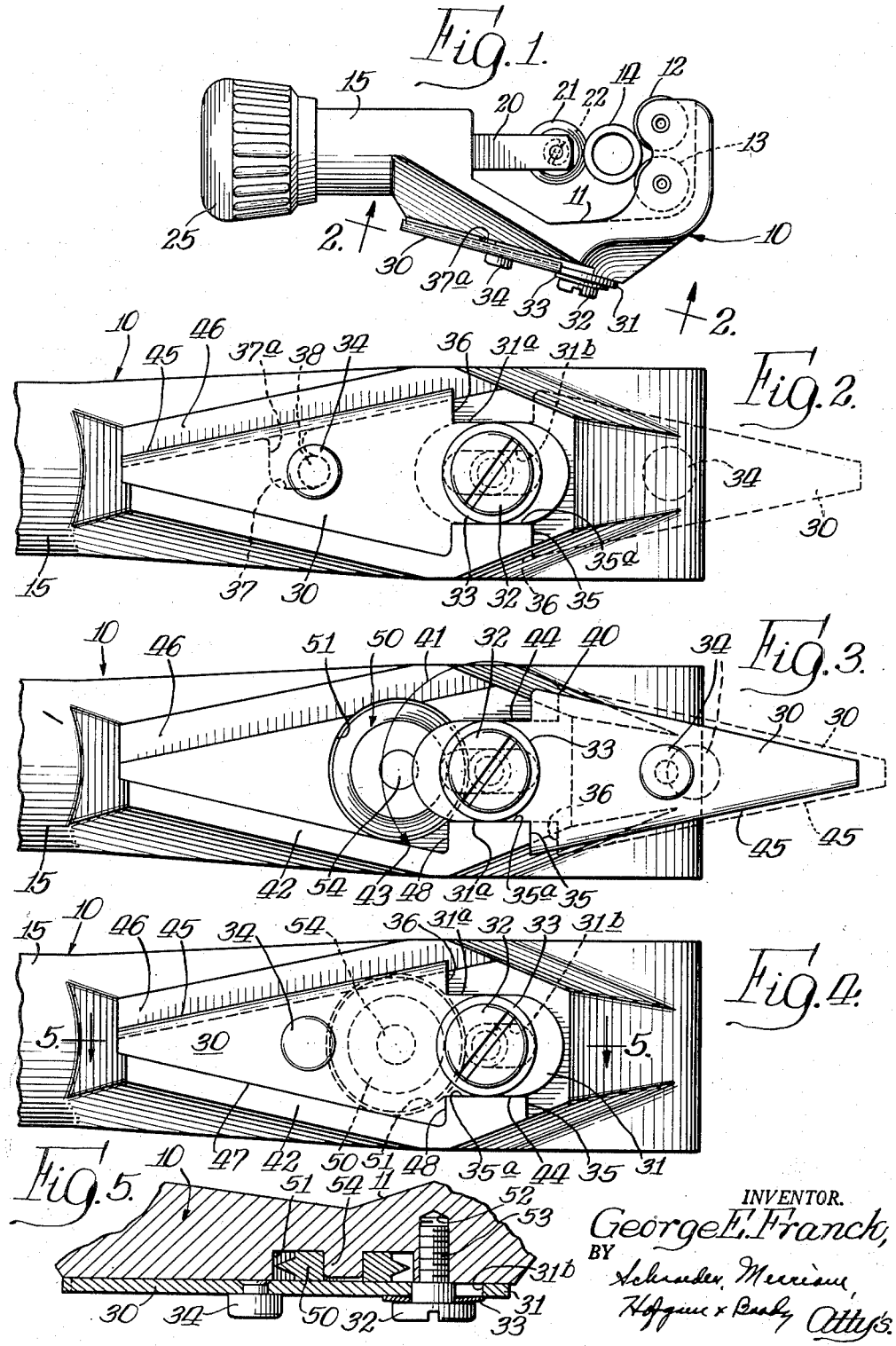
INVENTOR.
George E. Franck,
BY
Schrader, Merriam,
Hofgren & Brady Attys.

United States Patent Office 2,784,618
Patented Mar. 12, 1957

2,784,618

REAMER MEMBER FOR A TOOL

George E. Franck, Riverside, Ill., assignor to The Imperial Brass Manufacturing Company, a corporation of Illinois Application January 30, 1953, Serial No. 334,307

6 Claims. (Cl. 77—73.5)

This invention relates to a tube cutter, and more particularly to a hand operated tube cutter which may be used by mechanics in cutting relatively small tubing, such as copper, aluminum, steel and the like; and particularly to a means for providing a reamer and a spare cutting wheel in a tube cutting tool.

This application is a continuation in part of my co-pending application Serial No. 280,789, now abandoned, filed April 5, 1952, entitled "Cutting Tool" which in turn is a division of my co-pending application Serial No. 91,742, filed May 6, 1949, entitled "Cutting Tool," which has now matured into Patent No. 2,629,926, granted March 3, 1953.

The general object of this invention is to provide a tool of the character described with a reamer member selectively placeable in a plurality of positions.

Another object of the invention is to provide a tube cutter having a reamer mounted thereon for movement between operative and out of the way positions, and provided with means for locking the reamer in either of said positions.

Another object of the invention is to provide a tube cutter having a reamer mounted thereon in a manner permitting swinging of the reamer between operative and out of the way positions, and having means associated therewith for locking the reamer in either of its positions independent of structure other than the reamer and body member of the tool.

A further object of the invention is to provide a tube cutter having a means associated therewith for storing an extra cutter wheel in a position to be held in the body member by the reamer member.

Other features and advantages of the invention will be apparent from the following specification and drawings in which:

Figure 1 is a side elevational view of a tube cutter embodying the invention herein;

Figure 2 is a fragmentary enlarged sectional view taken substantially along line 2—2 in Figure 1, looking toward the cutter body and particularly the reamer member showing the reamer in out-of-the-way position in full lines and in operative position in dotted lines;

Figure 3 is a view similar to Figure 2 showing a modified form with the reamer member in open position and illustrating in dotted lines, the limit of the longitudinal movement of the reamer member relative to the body of the cutter member;

Figure 4 is a view similar to Figures 2 and 3, showing the reamer member in position on the body member of the tube cutter; and Figure 5 is a fragmentary enlarged sectional view taken substantially along line 5—5 in Figure 4 illustrating the means for storing a spare cutter wheel in the body member.

Several features of the disclosed invention are covered in my co-pending application identified above. Among these features are the structure of the operating handle with its antifriction bearing and the construction of the shank portion of the body to be described. The present invention is concerned primarily with the provision of a burring instrument and its manner and mode of attachment to the tube cutter tool and the means provided for storing a spare cutter wheel.

Inasmuch as the cutting operation very often results in small burrs in the bore of the tube which has been cut, it is often necessary for the workman to clear these burrs from the tube with a reamer after the cutting operation. I have provided a tube cutter having a reamer mounted on the bottom of the cutter and pivotably movable between operative and inoperative positions. In addition to being pivotably movable, the reamer is mounted for limited longitudinal movement and locking means are provided for locking the reamer against pivotable movement in either of its positions.

Referring now more particularly to the drawings, the tube cutter has a body member designated generally at 10 having an operating portion 11, across which the cutting element may move and having tube supporting means comprising a pair of rollers 12 and 13, forming between them a groove adapted to support a tube 14 to be cut. In the embodiment illustrated in the drawing, each roller may have a notched portion for receiving a flange or flare at the end of the tube. In remaking tube connections it sometimes becomes necessary or desirable to cut off the flanged or flared portion and again flare the tube. The provision of the notch makes it possible to cut off the tube at the base of the flange or flare with a minimum of waste.

Th body member 10 is also provided with a shank portion 15, having a bore therein to receive the square cutter holding member 20 for longitudinal movement within the shank 15. The bore of the shank 15 provides a bearing surface therein against which is mounted a portion of the operating parts to advance the cutter element from a withdrawn position against the shank 15, toward the rollers 12 and 13, so as to operatively cut a tube 14. An operating handle 25 is mounted on the mechanism within the shank 15 and upon rotation will move the cutter carrying element 20 in a direction toward and away from the rollers 12 and 13. This structure is more particularly described and claimed in my co-pending application Serial No. 91,742, now Patent No. 2,629,926, referred to above.

A cutter wheel or disc 21 is mounted for rotation in a bifurcated end portion of the cutter wheel holding element 20 by means of a short machine screw 22. In operation, a workman may place a tube 14 against the rollers 12 and 13 and by turning the knob 25 may advance the cutter element 21 against the tube 14 to perform a cutting operation. At the end of the cut, the cutter element may be retracted from the tube by a reverse rotation of the operating handle 25. Once the tube has been cut, it is likely that a thin burr will be found in the bore of the tube, and this burr must be removed. Instead of requiring the workman to pick up a special burr removing tool, a reamer is provided on the tube cutter itself. The structure comprises a triangular reamer member 30 having a projection or shank portion 31 at its base end with an elongated closed slot 31b therein. A screw or stud 32 is utilized to mount the reamer member on the bottom of the body portion of the tube cutter for pivotable movement and for limited longitudinal movement, the range of which is determined by the length of the slot. Preferably, a spring washer 33 is mounted on the screw to provide a friction component.

By means of the pivotal mounting of the reamer, it may be moved between the out of the way position shown in Figure 2 and an operative position shown in the dotted lines of Figure 2. A gripping member 34 projects from the outer surface of the reamer for facilitating movement of the reamer between its various positions. When the reamer is in operative position, cooperating shoulders 35 on the body member 10 and 36 on the reamer may serve to limit movement of the reamer relative to the body. This same function may be performed by contact of the end of slot 31b against the screw 32. A first locking means is provided for locking the reamer against pivotal movement when in its operative position, this means comprising cooperating shoulders 35a on the body member and 31a on the projection 31, so that when the reamer is pivoted to operative position and moves longitudinally to the left (as the parts appear in Figure 2) to the limit of its travel, these two shoulders abut, preventing pivotal movement of the reamer. When the reamer is in this position, the workman may grasp the body 10 to obtain the necessary leverage to ream the burr from the bore of the tube. Second locking means is provided for locking the reamer against pivotal movement when it is in out of the way position and is moved to the right (in Figure 2) to the limit of its longitudinal travel. This locking means comprises a groove 37 in the body member, the groove being generally L-shaped with the stem portion 37a forming an opening to admit a detent 38 on the underside of the reamer. When the reamer is moved longitudinally to its locked position as shown in Figure 2, the detent enters the base portion of the L-shaped groove and prevents pivotal movement of the reamer.

In Figure 3 the reamer blade as shown in dotted outline has been moved longitudinally to the right to a point wherein the longitudinal slot 31b (Fig. 4) in the shank portion will permit the blade to be swung in a counterclockwise direction toward its out of the way position. A rear corner 40 of the blade will follow the path arcuately shown as an arrow 41 until this corner contacts a shoulder 42 at the arrow point position 43. After this much movement, the reamer blade will extend out of its storage position and will noticeably extend out over the body member rather than being completely stored as will be the case when it is taken completely to the end of its movement. When the corner of the blade 40 strikes the shoulder 42 at 43, some additional pressure on the blade will be necessary to move it on past shoulder portion 43. As shown in Figures 2, 3 and 4 this pressure increase results at portion 43 because the distance between shoulder portion 43 and the axis of screw 32 is slightly less than the distance between corner 40 and the axis of screw 32 when the corner abuts this portion. However, as the blade is moved longitudinally and arcuately still further toward the fully stored position the distance between the corner 40 and the screw axis decreases relative to the distance between the portion of shoulder 42 against which corner 40 abuts and the screw axis, thereby allowing relatively freer movement into the fully stored position. The spring 33 provides enough friction on the reamer blade to require a definite push to move the reamer blade on toward its storage position.

In Figures 3 and 4 the shank portion 31 of the blade has a side 44 spaced from the slot 31b a distance equal to the width of the portion of the shank on the opposite side of the pin 32 fastening the blade to the body. In other words, the slot 31b is centrally located within the shank in order that the side portions shall be of equal width therearound. By this construction, the blade may be locked in its storage position hereinbefore referred to as "out of the way" position by virtue of a locking action similar to the locking action previously described for the blade when in operative position. The shoulder 44 formed on the shank portion of the blade comes to rest against the shoulder 35a formed on the body and securely holds the blade in its storage position as illustrated in Figure 4. The blade cannot swing outwardly from the body until it has been given a longitudinal movement to the left as viewed in Figure 4 to move the shank portion about the pin 32 to bring the pin into the outer end of the slot 31b. The handle 34, which is provided for ease of movement of the blade, does not in this instance have an inwardly projecting detent 38 as is the case where an L-shaped slot is used as shown in Figure 2. The locking action in both operative and out of the way positions is substantially the same employing a side of the shank portion of the cutter abutting against the shoulder 35a formed on the body portion of the tool.

One cutting edge of the blade, generally indicated at 45, is usually placed in the out of the way position on top of a portion 46 of the body member. The opposite edge 47, which is also a cutting edge, is placed inwardly against the shoulder 42 formed on the body member. The portion between the shoulder 42 and shoulder 35 here indicated as 48, is formed to accommodate the triangular shape of the cutter or reamer blade.

It often happens that a workman has a single cutting tool in his toolbox when called on a job away from his home base. In such instances, and particularly when cutting stainless steel tubing, the cutter wheel 21 will often break if too much pressure is applied to the cutter carrier 20 in forcing the cutter wheel against the tubing. In such instances, a workman has in the past been required to drop his work and return to his home base in order to obtain either a new tool or a replacement for the cutter wheel which he has broken. In the present tool, provision has been made for carrying a spare cutter wheel in such a manner that it does not interfere with the normal operation of the cutting tool. In Figure 5 a fragmentary section through a portion of the cutting tool shows a spare cutter wheel 50 stored within a recess 51 formed in the body 10 of the cutting tool. This recess 51 is placed closely adjacent to the bore 52 for accommodating the threaded portion 53 of the retaining screw 32 which holds the blade 30 onto the tool. As can be observed from Figure 3 the shank portion of the burring blade will always repose above a portion of the recess 51 and when the blade is in storage position it will obviously substantially cover the whole recess. Centrally disposed within the recess 51 is an upstanding boss 54 for the purpose of extending into the hub opening in the cutter wheel and holding it in place in cooperation with the portion of the reamer blade above the recess. Without the boss 54, the cutter might be removable from the recess when the reamer is in the dotted line position of Figure 3, wherein only a small portion of the shank extends over the recess.

The spare cutter wheel is placed in the recess 51 before the blade 30 is secured to the body member 10. Thereafter the wheel will remain in the recess, held there by the blade until such time as the blade is again removed. The cutter wheel may be removed from the recess after removal of the blade and can be used to replace the wheel 21 on the blade carrying member 20. The recess is ordinarily of a depth so that the top of the cutter wheel therein is flush with the surface of the body 10 under the stored reamer blade 30.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. In a tool, a body member, an elongated reamer member having a blade portion and a shank portion with parallel side edges and an elongated central slot dividing the shank portion into opposed side portions, screw means extending through said slot for swingably mounting the blade on the body for movement between an operative position extending outwardly from the body and an out of the way position against the body, a first shoulder on the body adjacent the screw means spaced therefrom a distance just slightly greater than the width of said side portions of said shank portion, said slot permitting the reamer to be moved longitudinally of the body in either of its extreme positions to move the reamer from a locked position against said shoulder to its swinging position and a second shoulder on the body member arranged to have abutment with a portion of the blade intermediate the operative and inoperative positions of the latter and so positioned as to require an increase, over a limited portion of its movement between the operative and inoperative positions, in the force necessary to move the reamer.

2. In a tool, a body member, an elongated reamer member, means for mounting said reamer member on said body for swinging movement between operative position and out of the way position overlaying the body member, and said body having a circular recess therein closely adjacent the mounting means for said reamer member so that a portion of said reamer member extends over said recess in all of its positions constituting a closure for the recess, said recess having a depth to accommodate a spare part of a size to fill the recess and be held therein by said reamer member.

3. In a tool as specified in claim 2 wherein a central stud is upstanding within said recess to repose within a portion of a part impaled thereon, said stud and reamer cooperatively retaining the part in the recess.

4. In a tool, a body member, an elongated reamer member, means for mounting said reamer on said body member for pivotal movement between the operative and out of the way positions and for limited longitudinal movement in either of said positions, first locking means operable when said reamer is in one longitudinal position for locking said reamer against pivotal movement when in operative position comprising cooperating shoulders on said reamer member and body member, means providing a constantly present frictional force for constraining longitudinal movement of the reamer, and second locking means operable when said reamer is in one longitudinal position for locking said reamer against pivotal movement when in out of the way position comprising a detent on one of said members and a recess in the other of said members having a wall for engaging said detent to prevent pivotal movement of the reamer member.

5. A tool as specified in claim 1 in which the body member has a recess adjacent said screw means for receiving a spare part in said recess with a portion of the part extending under said reamer member in all positions of the reamer member, said reamer member constituting a closure for the recess to retain the part therein.

6. In a tool, a body member, an elongated reamer member having a blade portion and a shank portion with parallel side edges and an elongated central slot dividing the shank portion into opposed side portions, screw means extending through said slot for swingably mounting the blade on the body for movement between an operative position extending outwardly from the body and an out of the way position against the body, a first shoulder on the body adjacent the screw means spaced therefrom a distance just slightly greater than the width of said side portions of said shank portion, said slot permitting the reamer to be moved longitudinally of the body in either of its extreme positions to move the reamer from a locked position against said shoulder to its swinging position, a second shoulder on the body member arranged to have abutment with the blade portion intermediate the operative and inoperative positions of the latter and so positioned as to require an increase, over a limited portion of its movement between the operative and inoperative positions, in the force necessary to move the reamer to the inoperative position, and a third shoulder on the body member arranged to abut the reamer blade portion in the operative position thereof positively to prevent longitudinal movement of the blade portion toward said screw means.

References Cited in the file of this patent
UNITED STATES PATENTS

| Number | Name | Date |
|---|---|---|
| 536,554 | Vinton | Mar. 26, 1895 |
| 1,134,307 | Woodward | Apr. 6, 1915 |
| 1,186,807 | Litomy | June 13, 1916 |
| 1,272,228 | Dahl | July 9, 1918 |
| 1,372,807 | Gallinek | Mar. 29, 1921 |
| 1,538,641 | Liljeqvist | May 19, 1925 |
| 1,945,949 | Myers | Feb. 6, 1934 |
| 1,969,168 | Edelmann | Aug. 7, 1934 |
| 2,126,951 | Dobrick | Aug. 16, 1938 |
| 2,513,842 | Cann | July 4, 1950 |
| 2,536,161 | Edelmann | Jan. 2, 1951 |
| 2,630,028 | McIntosh | Mar. 3, 1953 |